3,662,067
FUNGICIDAL METHOD AND COMPOSITION
Georges A. L. Richard, Bougival, Jean-Marie F. Cognet, La Celle-Saint-Cloud, Jean Heullant, Le Raincy, and Jean-Pierre Vallier, Paris, France, assignors to U.S. Philips Corporation, New York, N.Y.
No Drawing. Filed Mar. 18, 1969, Ser. No. 808,317
Claims priority, application France, Mar. 27, 1968, 145,625; Dec. 30, 1968, 181,920
Int. Cl. A01n 9/02, 9/12
U.S. Cl. 424—245                           4 Claims

ABSTRACT OF THE DISCLOSURE

Fungicidal mixtures for seed treatment containing as active ingredients a mixture of a metal salt of a hydroxyquinoline and 2,3-dihydro-5-carboxanilido-6-methyl-1,4-oxathiin.

---

This invention relates to a novel composition and method for inhibiting the growth of fungi, particularly on seeds.

In the French Pats. No. 1,477,059 and 1,477,060 of Apr. 21, 1966 and U.S. Pat. 3,249,499 of May 3, 1966 there are described 2,3-dihydro-5-carboxamido-6-methyl-1,4-oxathiins of the formula

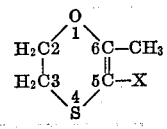

wherein X represents a carboxamido radical, in particular a radical of the formula

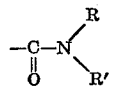

wherein R is hydrogen or methyl and R' is alkyl, alkenyl, cycloalkyl, aryl or substituted aryl. Among the oxathiins specifically mentioned is 2,3-dihydro-5-carboxanilido-6-methyl-1,4-oxathiin.

Further in French Pat. 1,477,061 and 1,477,062 of Apr. 21, 1966 corresponding derivatives are described in which to the nuclear sulfur there is attached one or two atoms of oxygen such as sulfoxides and sulfones. It is mentioned in these patents that these oxathiins are useful for protecting plants and seeds from plant pathogenic fungi.

The systemic fungicidal activity of this compound is described. However, this oxathiin suffers from the disadvantage of being substantially ineffective against such plant harmful fungi as Penicillium Sp and Septoria nodorum as well as others.

According to the invention, it has been found that the antifungal spectrum of these prior art oxathiins, having the generic formula

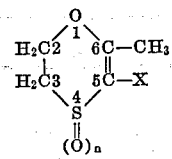

wherein X represents a carboxamido radical and $n=0$, 1 or 2, particularly that of 2,3-dihydro-5-carboxanilido-6-methyl-1,4-oxathiin may be considerably broadened and in many cases an unexpected synergestic effect produced by the addition thereto of a salt or ester of 8-hydroxyquinoline. As such may be mentioned the copper salt of this compound (copper 8-quinolinolate) and oxyquinolinolate sulphate and oxyquinolinolate benzoate. In particular good results have been obtained with combinations of the said copper salt of 8-hydroxy-quinoline and 2,3-dihydro-5-carboxanilido-6-methyl - 1,4 - oxathiin. For the sake of brevity the copper salt of 8-hydroxy-quinoline will be designated hereinafter as "copper quinolinolate" whereas 2,3-dihydro-5-carboxanilido-6-methyl-1,4-oxathiin will be designated "carboxanilido-oxathiin."

Thus the novel fungicidal compositions of the invention, particularly the combination of copper quinolinolate and the carboxanilido oxathiin, have the advantage of being highly effective against both internal and external pathogenic fungi.

Thus, the novel compositions of the invention are highly effective against fungi of the class of Basidiomycetes such as Rhizoctonia Kuhl and Uromyces phaseoli typica Arth which are plant pathogenic fungi living in the soil.

Further, the fungicidal compositions of the invention are particularly effective against internal fungi of cereal and corn crops such as Ustilago nuda which is transmitted through the seeds.

It should be noted that until now only by a very careful hot-water treatment could the infection of the seeds by the Ustilago fungi be controlled.

The fungicidal compositions of the invention is also highly effective against a number of other external pathogenic fungi such as Tilletia Caries, Septoria nodorum, Fusarium graminearum and Fusarium nivale.

The copper quinolinolate has been employed in the past to control seeds against the infection of these external pathogenic fungi, a dose of about 30 grams per 100 kg. of the seeds being usually employed.

However, the copper compound is useless in practice against the internal fungi including the above-mentioned species.

The novel fungicidal compositions of the invention, more in particular the combination of the copper quinolinolate and the carboxanilido oxathiin, in a ratio by weight of about 1:15 to 3:5, has the unexpected advantage of producing a fungicidal activity in excess of that expected from the combination of the two compounds thus producing a synergestic effect while at the same time having the significant advantage of allowing a single composition to be employed for the control of the external and internal fungi of grain seeds.

In particular the invention relates to fungicidal compositions containing from 10–60 parts by weight of copper quinolinolate in relation to 112.5 parts by weight of carboxanilido oxathiin.

In general fungicidal compositions comprising 10–20% by weight of copper quinolinolate and 40–60% by weight of carboxanilido oxathiin and for the remainder carrier materials and adjuvants are effective when applied in amounts of 100–300 g. to 100 g. of seed of wheat or barley.

Further fungicidal compositions comprising 10–20% by weight of copper quinolinolate and 5–10% by weight of carboxanilido oxathiin and for the remainder carrier materials and adjuvants are effective when applied in amounts of 100–300 g. to 100 kg. of seed of oat.

Although in the foregoing special reference is made to the carboxanilido oxathiin and copper quinolinolate compounds, also the other oxalthiins as described in the above mentioned French and United States patent specifications and the other 8-hydroxy quinoline derivatives as indicated hereinbefore may be employed in this invention.

Particularly useful are those of the above-noted formula in which R is hydrogen, and R' is alkyl of 1 to 10 carbon atoms, phenyl, monosubstituted phenyl for example, substituted with chloro, methyl, ethoxy and similar substituents; disubstituted phenyl such as 2,6-dimethyl phenyl; 2,5-dichlorophenyl; 3,4-dichlorophenyl; 2-methyl-5-chloro-phenyl or trisubstituted phenyl such as 2,4,6-trimethyl phenyl.

Specific examples of the oxathiins that may be employed are:

2,3-dihydro-5-carboxanilido-6-methyl-1,4-oxathiin

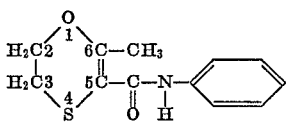

2,3-dihydro-5-N-(o-tolyl)carboxamido-6-methyl-1,4-oxathiin;
2,3-dihydro-5-N-(m-tolyl)carboxamido-6-methyl-1,4-oxathiin;
2,3-dihydro-5-N-(p-tolyl)carboxamido-6-methyl-1,4-oxathiin;
2,3-dihydro-5-N-(2-chlorophenyl)carboxamido-6-methyl-1,4-oxathiin;
2,3-dihydro-5-N-(4-chlorophenyl)carboxamido-6-methyl-1,4-oxathiin;
2,3-dihydro-5-N-(2-biphenyl)carboxamido-6-methyl-1,4-oxathiin;
2,3-dihydro-5-N-(n-butyl)carboxamido-6-methyl-1,4-oxathiin;
2,3-dihydro-5-N-(cyclohexyl)carboxamido-6-methyl-1,4-oxathiin;
2,3-dihydro-5-N-(allyl)carboxamido-6-methyl-1,4-oxathiin;
2,3-dihydro-5-N-(alpha-naphthyl)carboxamido-6-methyl-1,4-oxathiin;
2,3-dihydro-5-N-(p-ethoxyphenyl)carboxamido-6-methyl-1,4-oxathiin;
2,3-dihydro-5-(N-methyl, N-phenyl)carboxamido-6-methyl-1,4-oxathiin;
2,3-dihydro-5-N-(2,4-dimethylphenyl)carboxamido-6-methyl-1,4-oxathiin;
2,3-dihydro-5-N-(m-methoxyphenyl)carboxamido-6-methyl-1,4-oxathiin;

The invention will now be described in greater detail with reference to the following examples:

In the first group of tests, eleven dusting compositions for treatment of seeds were prepared. Two quantities of the carboxanilido oxathiin were employed (112.5 g. and 56.2 g.) and three quantities of the copper quinolinolate (10, 20 and 30 grams).

The compositions were prepared by mixing 75% of 2,3-dihydro-5-carboxanilido-6-methyl-1,4 - oxathiin sold commercially as "Vitavax," technically pure copper quinolinolate, kaolinite as a carrier material and 1% by weight (of the total mixture) of sodium lignosulphonate. These doses are those that have been employed for the treatment of 100 kg. of seeds, the 112.5 grams of the carboxanilido oxathiin being the amount required [1] the Ustilago fungi. The compositions were adjusted uniformly to 200 g. by the addition of mineral carriers, adjuvants, adhesives, or wetting agents compatible with the active materials. The compositions were ground in such a fashion that the average grain size obtained results in a total retention of the powder or the seed and a complete covering of the surface of the seed.

[1] To destroy.

TABLE I.—TEST COMPOSITIONS
[Amounts in grams]

| Number: | 2,3-dihydro-5-carboxanilido 6-methyl-1,4 oxathiin | Copper quinolinolate | Mineral carriers and adjuvants |
|---|---|---|---|
| 1 | 112.5 | 0 | 87.5 |
| 2 | 112.5 | 10 | 77.5 |
| 3 | 112.5 | 20 | 67.5 |
| 4 | 112.5 | 30 | 57.5 |
| 5 | 56.2 | 0 | 143.8 |
| 6 | 56.2 | 10 | 133.8 |
| 7 | 56.2 | 20 | 123.8 |
| 8 | 56.2 | 30 | 113.8 |
| 9 | 0 | 10 | 190 |
| 10 | 0 | 20 | 180 |
| 11 | 0 | 30 | 170 |

The seeds utilized in these tests were contaiminated wheat seeds of the variety Etoile De Choisy.

The coating of the seeds was carried out on lots of equal size by dusting the seeds with dry powder in glass bottles which were subjected to a mechanical agitation for equal periods of time.

By visual examination it was determined when a uniform coating had been achieved and when there was only an insignificant amount of the powder on the surface of the bottle.

The test method employed was that of Ulster. For each of eleven of the treated samples, 100 grains were taken and distributed equally in 10 Petri dishes containing agar. 100 grains not treated were similarly placed in 10 Petri dishes.

The examination of the Petri dishes and the counting of the colonies of the fungi was carried out 5 days after the seed were treated.

TABLE II.—RESULTS OF COUNTING

| | Fungi (Number of colonies) | | |
|---|---|---|---|
| | Septoria nodorum | Fusarium nivale | Penicillium Sp. |
| Control | 26 | 5 | 11 |
| Composition No.: | | | |
| 1 | 11 | 1 | 9 |
| 2 | 0 | 1 | 2 |
| 3 | 0 | 0 | 0 |
| 4 | 0 | 0 | 0 |
| 5 | 20 | 3 | 12 |
| 6 | 3 | 0 | 0 |
| 7 | 0 | 0 | 1 |
| 8 | 0 | 0 | 0 |
| 9 | 8 | 6 | 2 |
| 10 | 7 | 6 | 1 |
| 11 | 11 | 4 | 1 |

The fungicidal effectiveness of a product is expressed according to the following formula:

$$\frac{T-t}{T} \times 100$$

in which:

T designates the number of colonies of the fungus in the sample seed, and t designates the number of colonies of the fungus in the treated seed.

These results are shown in the following table:

TABLE III.—PERCENTAGE OF EFFECTIVENESS ON THE FUNGI

| | Septoria nodorum | Fusarium nivale | Penicillium Sp. |
|---|---|---|---|
| Product No.: | | | |
| 1 | 57.6 | 80 | 18.2 |
| 2 | 100 | 80 | 81.8 |
| 3 | 100 | 100 | 100 |
| 4 | 100 | 100 | 100 |
| 5 | 23.07 | 40 | 0 |
| 6 | 88.4 | 100 | 100 |
| 7 | 100 | 100 | 90.9 |
| 8 | 100 | 100 | 100 |
| 9 | 69.2 | 0 | 81.8 |
| 10 | 73.07 | 0 | 90.9 |
| 11 | 57.6 | 20 | 90.9 |

From an examination of this Table III, it will be apparent that a significant synergestic effect is present when the copper quinolinolate is employed together with the carboxanilido oxathiin.

A synergestic effect is considered to be present when two fungicides X and Y when employed together produce a fungicidal effect in excess of that of X and Y when used alone in the same quantities as in the mixture.

For example on—

(1) *Septoria nodorum*: The carboxanilido oxathiin at a dose of 56.2 g. has an effectiveness of 23.07%, the copper quinolinolate at a dose of 20 grams has an effectiveness of 73%, the sum of the effects being 96.07%. However, in composition number 7 which contains 56.2 g. of the carboxanilido oxathiin and 20 grams of the copper quinolinolate a total protection is achieved, an effectiveness of 100%.

Further, 30 g. of the copper quinolinolate has an activity of 57.6%. Thus the sum of the effects of these 30 g. plus that of the 56.2 g. of the carboxanilido oxathiin is 80.67%. However, composition number 8 which contains 56.2 g. of the carboxanilido oxathiin and 30 g. of the copper quinolinolate is 100% effective in destroying this fungus.

(2) *Fusarium nivale*: The carboxanilido oxathiin at a dose of 112.5 g. is 80% effective and 20 g. of the copper quinolinolate has no effect. The total expected effect is 80%. However, composition number 3 which contains 112.5 g. of the carboxanilido oxathiin and 20 g. of the copper quinolinolate is 100% effective in destroying this fungus.

Further, 30 g. of the copper quinolinolate produces only a 20% effect in destroying this fungus. 56.2 g. of the carboxanilido oxthiin is 60% effective in destroying this fungus. Thus the total effectiveness to be expected is 80%. However, composition number 8 which contains 56.2 g. of the carboxanilido oxathiin and 30 g. of the copper quinolinolate is 100% effective in destroying this fungus.

Besides the synergestic effect, it will be noted also that the compounds taken together have an excellent complementary effect in their fungicidal activities.

Thus on *Septoria nodorum* the effectiveness of the carboxanilido oxathiin ranges from 23.07 to 57.6% while that of the copper quinolinolate ranges from 57.6 to 73.07%. However, when taken together a total effectiveness is achieved in 5 compositions out of 6 (mixtures 2, 3, 4, 7 and 8).

When applied to *Fusarium nivale* similar results are noted. For here too, most of the compositions containing both of the compounds show 100% effectiveness against this fungus, compositions 3, 4, 6, 7, and 8.

Finally, against *Penicillium* sp. the results show that the composition of the invention is in most cases 100% effective against this fungus, copositions 3, 4, 6 and 8.

The compositions of the invention may be applied to seeds as a dust either alone or in mixture, with powdered solid carriers such as natural clay such as dolomite, kaolinite, montmorillonite, attapulgite, mica, talc and pyrophyllite. Such powders may be applied to the seeds by tumbling.

The compositions may also be applied to the seeds in the wet form by the addition of wetting agents such as those described in column 1, line 50 to column 2, line 4 of the U.S. Pat. 3,362,873, for example sodium lauryl sulfate and octyl sodium sulfosuccinate. Aqueous compositions containing the compositions of the invention and the wetting agents may be applied to the seeds by spraying or by preparing a wet slurry and mixing the seeds with the slurry.

Representative examples of the inventive compositions are the following:

1. For the treatment of 100 kilograms of barley or wheat seeds:

| | G. |
|---|---|
| Carboxanilido oxathiin | 100 |
| Copper quinolinolate | 30 |
| Mineral carriers and adjuvants | 70 |
| Total | 200 |

In general 100–300 g. of this composition are effective to protect 100 kg. of barley or wheat seeds.

For the treatment of 100 kilograms of oat seeds:

| | G. |
|---|---|
| Carboxanilido oxathiin | 15 |
| Copper quinolinolate | 30 |
| Mineral carriers and adjuvants | 155 |
| Total | 200 |

In general 100–300 grams of this composittion is effective to protect 100 kg. of oat seeds.

Besides the fungus already mentioned, the novel compositions of the invention may be used in seed to control *Ustilago tritici* in wheat, *Ustilago nuda* and *Ustilago hordei* in barley and *Ustilago avenae* in oat and further Septorium, Fusaricum and Pericillium species in wheat, barley and oat.

The antifungal treatment of the seeds may also be combined with a protection against insects of the soil as well as bird repellent agents.

As insecticides there may be employed lindane, heptachlor, and insecticides of the organic phosphorus type and others.

Anthraquinone is an example of a bird repellent that may be employed.

An example of a composition combining all of these types of protection is:
33.5% carboxanilido oxathiin
10% copper quinolinolate
16.6% lindane
16.6% anthraquinone
16.3% kaolin
5.0% of a mixture of calcium alkylarylsulfonate and a polyoxyethylene derivative of an alkylphenol
2.0% sodium lignosulfonate.

300 g. of such a composition is applied to 100 kilograms of seeds.

Besides their use as a seed disinfectant the novel compositions of the invention may be applied to fruit for protection against *Penicillium* sp. and other fungi and for the antifungal protection of wood, paper, textiles and other industrial materials.

In the field of industrial anti-fungal treatment, the compounds of carboxanilido oxathiin and copper quinolinolate satisfy all the protection problems, the known solutions of which are imperfect owing to the difficulties in methods of application.

Without the following fields of application being considered as restrictive, the following may be mentioned by way of example:

(a) The protection of woods: The new compounds ensure to the bark state just after pelling, the stream of sap being still considerable, a deep protection due to the systemic action of carboxanilido oxathiin, while the insolubility of copper quinolinolate protects the wood superficially against all attacks by pathogenic agents.

For timber, after sawing, the same holds, although the penetration is slower, but it is easy to constitute the composition of treatment with a view to its application by soaking or pulvering in order that the same result be obtained.

(b) The protection of textiles, in particular all textiles which are subject to the bad action of atmospheric influences (tent cloth, awnings, sandbags, etc.).

(c) The treatment of rope, leather, size etc.

(d) The preservation of paper pulp in the humid phase, the treatment of packing paper, that of articles of plastic material, etc.

(e) The protection of paints against degradation agents or obtaining of paint having fungicidal activity by the additional of the new fungicidal compounds to the constituents of the paint.

In general, the proportion by weight between the copper quinolinolate and carboxanilido oxathiin preferably is from approximately 1:15 to 3:5.

All seeds (cereals, beets, beans, vegetables and trees) may benefit by the fungicidal treatment according to the invention.

What is claimed is:

1. An antifungal composition comprising a mixture of 2,3-dihydro-5-carboxanilido-6-methyl-1,4-oxathiin and the copper salt of 8-hydroxy quinoline, about 10–60 parts by weight of the quinoline compound being present for each 112.5 parts by weight of the oxathiin compound.

2. A method of controlling fungi on living plants and seeds comprising treating said plants or seeds with a fungicidally effective amount of the antifungal composition of claim 1.

3. The method of controlling fungi on seeds of wheat or barley comprising treating said seeds with a fungicidally effective amount of the antifungal composition of claim 1.

4. The method of controlling fungi on seeds of oat comprising treating said seeds with a fungicidally effective amount of the antifungal composition of claim 1.

References Cited

UNITED STATES PATENTS

| | | | |
|---|---|---|---|
| 2,721,824 | 10/1955 | Feigin et al. | 424—245 |
| 3,249,499 | 5/1966 | Von Schmeling | 424—276 |
| 3,402,241 | 9/1968 | Von Schmeling | 424—276 |

FOREIGN PATENTS

| | | | |
|---|---|---|---|
| 1,037,766 | 6/1955 | France | 424—245 |

ALBERT T. MEYERS, Primary Examiner

D. J. FUNDERBURK, Assistant Examiner

U.S. Cl. X.R.

424—276